(12) United States Patent
Dassow et al.

(10) Patent No.: US 7,409,049 B2
(45) Date of Patent: Aug. 5, 2008

(54) NETWORK-BASED SECURING OF ADDED-VALUE SERVICES AGAINST AUTOMATED CONNECTIONS

(75) Inventors: Heiko Dassow, Griesheim (DE); Guido Koeppe, Griesheim (DE); Reinhold Wehner, Rossdorf (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 10/556,292

(22) PCT Filed: Apr. 27, 2004

(86) PCT No.: PCT/DE2004/000875

§ 371 (c)(1),
(2), (4) Date: Jun. 8, 2006

(87) PCT Pub. No.: WO2004/102939

PCT Pub. Date: Nov. 25, 2004

(65) Prior Publication Data

US 2007/0019796 A1    Jan. 25, 2007

(30) Foreign Application Priority Data

May 9, 2003    (DE) ................................ 103 21 122

(51) Int. Cl.
*H04M 15/00*    (2006.01)
*H04M 11/00*    (2006.01)
*H04M 17/00*    (2006.01)

(52) U.S. Cl. ............... 379/114.14; 379/93.03; 379/100.06; 379/143; 379/201.02; 379/207.13

(58) Field of Classification Search ... 379/93.02–93.03, 379/93.12, 93.18, 93.23, 114.14, 114.24, 379/114.25, 127.02, 127.03, 145, 184, 189, 379/190, 194, 100.06, 143, 201.01, 201.02, 379/207.13, 207.14, 210.02
See application file for complete search history.

(56) References Cited

U.S. PATENT DOCUMENTS

| 5,276,444 | A | * | 1/1994 | McNair | ...................... 340/5.8 |
| 6,154,529 | A | * | 11/2000 | Yamauchi | .............. 379/114.28 |
| 6,198,810 | B1 | | 3/2001 | Lueder et al. | |
| 6,400,812 | B1 | * | 6/2002 | Svedberg et al. | ........ 379/114.14 |

FOREIGN PATENT DOCUMENTS

| DE | 4439068 | 5/1996 |
| DE | 69028384 T2 | 1/1997 |
| DE | 10001079 | 7/2001 |
| DE | 10039285 | 2/2002 |
| EP | 0483860 | 5/1992 |
| EP | 0722241 | 7/1996 |
| EP | 0794648 | 9/1997 |
| WO | WO 00/33557 | 6/2000 |

* cited by examiner

*Primary Examiner*—Binh K Tieu
(74) *Attorney, Agent, or Firm*—Kenyon & Kenyon LLP

(57) ABSTRACT

A network-based verification of call connections is provided between a telecommunications subscriber terminal and a telecommunications service device selected by a service call number. This verification provides a way of enabling secure protection against an undesired selection of a service device and/or the selection of an undefined service device. A system and a method are provided in which during a call set-up, the selected call number is evaluated on the basis of at least one service call number stored in a communication network and/or at least one service call number area. In response to the identification of a service call number, the transmission of a defined confirmation information message from the telecommunication subscriber terminal is requested for the verification of the call connection, and in response to a mismatch between the requested confirmation information message and the confirmation information message transmitted, or not, by the telecommunication subscriber device, the call set-up is interrupted.

23 Claims, 5 Drawing Sheets

NETWORK-BASED SECURING OF ADDED-VALUE SERVICES AGAINST AUTOMATED CONNECTIONS

FIELD OF THE INVENTION

The present invention relates to a method and a system for the network-based verification of telephone connections from a telecommunications subscriber terminal device to a telecommunications service device selected by a service telephone number, and more specifically, for the network-based securing of added-value services against automated connections.

BACKGROUND INFORMATION

In the telephone number space of the public telephone network, essentially irrespective of whether the telephone network takes the form of a fixed network or a mobile network, the number of service facilities selectable by dialing a service telephone number appears to be rising steadily. Via such selectable service devices, for example, it may be possible to retrieve announcement and/or information services via the telecommunications network or also to enable audio and/or video conferences. Normally the service telephone numbers associated with the respective service devices for selecting particular services are subsumed in special telephone number ranges.

In this respect there are destination telephone numbers for which the connection charges are significantly higher than the normal rate. In Germany, for example, destination telephone numbers having higher connection charges may be found, for instance, in the telephone number ranges 00xx, 0137xx, 015xx, 016xx, 017xx etc. There also, for example, are destination telephone numbers having rates that can be freely determined by the respective provider. Such destination telephone numbers exist, for example, in the telephone number ranges 11xx, 012xx, 019xx, the service telephone numbers in the number range 0190x and the future number range 0900x being used in Germany, for example.

Telephone numbers having higher rates and/or for which the rates can be freely set may be used by companies for marketing the most varied contents and/or services that go beyond the basic use of the telecommunications network. Examples of services offered for a fee, that is, so-called added-value services, include, among others, information services, ordering hotlines, special consultations and/or weather information by telephone.

For example, in Germany, the telephone numbers from the 0190x range are currently allotted to the network operators of the respective telephone network in blocks of 1000, the telephone numbers 090-1 through 0190-9 being based on fixed rate structures in this case. For telephone numbers from the subrange 0190-0, no rate limits are currently prescribed, for example, in order to allow interested providers of fee-based services to set their own rates appropriate to the respective added-value service. This meets the market's requirements for flexible, performance-related rates, while providing users of such services with an anonymous, convenient method of payment by telephone bill without having to divulge bank data or a credit card number. Normally, the user of such a service pays by his call, that is, the collection occurs via the telephone bill, and the call for an added-value service use in this case would be charged at a higher fee than a regular telephone connection. In addition to legitimate providers making offers of value, however, dubious providers also use this form of marketing.

The telephone numbers of the dubious providers may be priced extremely high. Service offers from dubious providers often consciously exploit human weaknesses such as inattentiveness, credulity, and/or fear mongering. Further, the service users may be in part consciously or with fraudulent intent left in the dark regarding, for example, the amount of fees incurred with the use of the fee-based service. The number of subscribers who want to protect themselves against this growing threat is rising steadily. Frequently, however, the destinations or offers which are desirable or undesirable from the subscriber's perspective lie in close proximity in the telephone number space, are mixed and/or are subject to constant change such that the undesirable destinations are not known at all.

The current method of selecting providers, for example, of fee-based services, via specific telephone number ranges such as the (0)190 telephone number range, does not sufficiently ensure that service users are comprehensively informed about the type, content, and fees incurred following the selection of the respective service device and that the service users availing themselves of the service thus offered always do so in a conscious manner. Consequently, in principle, this affects, albeit in different ways, all service users who make use of a fee-based service, for example, those by telephone, fax, SMS, MMS or PC.

Furthermore, dubious providers seek to generate calls to their service telephone number by all means. One available example of this is the so-called dialer, i.e., software which is able to establish connections at times without the knowledge on the part of an owner of a PC/computer. This can affect, for example, those Internet users who have not implemented appropriate protective measures such as the use of hardware/software-based dialer blockers, virus scanners or firewalls. Thus, for such users, the dialers may initially install themselves unbeknownst to the user and subsequently, following the installation of the software, for example, after the immediate disconnection of the current connection, may establish a telephone connection to a fee-based service telephone number automatically via the standard connection function in the remote data transmission network when the user dials into the Internet and/or directly when the operating system is launched.

Some defense options are available against undesired service use.

For example, when using the Internet, a hardware-based dialer blocker may be interconnected between the telephone jack and the modem. For this purpose, the dialer blocker is configured in such a way that a predefined number of telephone numbers can be programmed into it. A connection can be established exclusively via these telephone numbers. Any attempt to establish a connection via a telephone number that deviates from them is prevented.

Furthermore, software-based dialer warning programs such as "190-Warner" or "YAW" may be installed on a PC in order to monitor the remote data transmission network and/or the TAPI (Telephone Application Programming Interface) and CAPI (Cryptography Application Program Interface) interfaces. In this case, the user may specify which programs or via which telephone numbers an online connection may be established in an outgoing direction. All connection attempts beyond these restrictions are blocked and are deblocked or cleared only following an express authorization by the user.

Moreover, modern private branch exchanges may normally be programmed using a so-called black list. Depending on the technical design of the equipment, such a black list holds a certain number of freely programmable telephone numbers. In the event of a dialing attempt to the outside, that is, an outgoing telephone connection via a telephone number contained in the black list, the equipment blocks or rejects the connection set-up.

Further, net-based approaches on the part of the respective network operator may be available for blocking telephone number ranges for a certain subscriber terminal device. The protective mechanism here lies in the fact that upon request from a subscriber, the network operator ensures in his technical facilities such as, for example, the switching exchanges that from the respective subscriber terminal device it is not possible to select, for example, the 0190 telephone number range in the outgoing direction, that is, that this range is blocked. This permanent barrier also prevents any use of desired services within this telephone number range.

Security packages also may be available which allow incoming and outgoing connections on the user side to be admitted based on a white list or to be blocked on the basis of a black list. In detail, a variable connection barrier allows the user himself to block outgoing dial-up connections on his telephone, for example connections to 0190 telephone numbers, it being possible in each case to block only one of several predefined telephone number ranges.

Variable telephone number blocking, which is controlled via a telephone number list, allows the user to generate either white lists or black lists. Consequently, it is possible on the basis of a black list to block outgoing dial-up connections to undesired telephone numbers or telephone number groups as non-admissible destinations, while all other telephone numbers remain accessible. Alternatively, it is possible on the basis of a black list to clear only the outgoing dial-up connections to desired telephone numbers or telephone number groups as admissible destinations, while blocking all other telephone numbers. In this manner, the user is able to define up to 10 telephone numbers or telephone number groups, each having a maximum of 20 digits, and to program them by numeric code via the subscriber terminal device itself.

These available list spaces or the available capacities, however, are often insufficient for a differentiated filtering of telephone connections required from the perspective of the subscriber. In order to obtain sufficient security, entire telephone number ranges must be blocked as a consequence of this limited capacity. This has the consequence that the legitimate offers contained in these ranges are likewise no longer available.

All of the above-mentioned defense measures thus have one common disadvantage in that free access to service offers via a telecommunications network is made difficult or even impossible. In addition there is the fact that in some cases the task of taking possible protective measures may be too demanding for a layperson even if the person is prepared to bear the additional financial cost.

SUMMARY OF THE INVENTION

Some embodiments of the present invention provide a secure protection against an undesired selection of a service device and/or a selection of an undefined service device, while allowing for an otherwise essentially unproblematic conscious utilization of services offered via service devices without requiring technical pre-adjustments.

Some embodiments of the present invention provide a network-based verification of telephone connections from a telecommunications subscriber terminal device to a service device selected via a service telephone number which is provided in such a way that during a call set-up an evaluation of the selected telephone number is performed based on at least one service telephone number stored on the side of a telecommunications network and/or at least one stored service telephone number space, the transmission of a defined confirmation information from the telecommunications subscriber terminal device being requested for verifying the telephone connection in response to the identification of a service telephone number, and the call set-up being cancelled in response to a mismatch between the requested confirmation information and one or none of the confirmation information transmitted.

Some embodiments of the present invention provide that a system, which comprises at least one memory, assignable to at least one telecommunications network, for the readable storage of a number of service telephone numbers and/or service telephone number spaces, as well as a device for evaluating on this basis a telephone number to which a call is to be set up from a telecommunications subscriber terminal device, and a verification device, which is designed to compare a defined confirmation information with a confirmation information transmitted from the telecommunications subscriber terminal device in response to the identification of a service telephone number and to cancel the call set-up in response to a mismatch between the defined confirmation information and the or no confirmation information transmitted from the telecommunications subscriber terminal device. Embodiments of the present invention provide a service offered via a service telephone number, e.g., a fee-based added-value service, to be selected only if this is explicitly confirmed by the outgoing telecommunications subscriber terminal device during the call set-up.

Some embodiments of the present invention ensure an essentially improved protection against automated telephone connections, for example, with the use dialers, to fee-based added-value services.

Some embodiments of the present invention provide that the installation and set-up of a network-based and/or subscriber-based blocking and/or clearing of service telephone numbers that must be predefined and that may also be subject to change is thus no longer necessary.

In some embodiments of the present invention, to signal in a simple manner that the telephone connection is being verified, the embodiment(s) provide for the transmission of a request to the telecommunications terminal device to transmit the defined confirmation information.

Further, in some embodiments, in order to release again tied-up network capacities and/or in the case of a rate calculation of a verification to be carried out, it is provided in an expedient manner to cancel the call set-up following the request of the confirmation information in response to the elapse of a predefined time interval if no confirmation information is transmitted from the telecommunications subscriber terminal device.

Even if, for example, a number from a list of single-use numbers, which has been previously assigned and transmitted to the telecommunications subscriber terminal device, can already suffice as a defined confirmation information, a further embodiment provides for increasing the security by uniquely assigning the defined confirmation information to the call set-up.

And, a further embodiment of the present invention provides for the defined confirmation information to be generated only in response to the identification of a service telephone number, particularly with the aid of a random-number generator, and to be subsequently transmitted to the telecommunications subscriber terminal device.

In a further embodiment, in order to offer a respective subscriber the option of choosing whether or not to perform a verification according to the present invention and/or if in the connection of the telecommunications subscriber device for certain service telephone numbers a permanent or variable telephone number barrier was already additionally switched, the present invention further provides for the selected telephone number to be evaluated only in response to a defined initial numeral sequence encompassed by the telephone number.

In further embodiments, to allow the respective subscriber to make a conscious decision for or against the set-up of the call to the selected service device in the case of a verification, in response to the identification of a service telephone number, a stored information assigned to this service telephone number is transmitted to the telecommunications subscriber terminal device.

In further embodiments, for example, in an application-specific manner, it is provided for the transmission of information to and/or from the telecommunications subscriber terminal device to occur by using an interactive voice-communication system, a multi-frequency method, visually and/or in terms of multimedia. Depending on the telecommunications subscriber terminal device used, some further embodiments thus also supports the transmission of multimedia data across networks generally and across the Internet, for example.

The telecommunications terminal device essentially may be any mobile telephone device or fixed network device such as a telephone, a PC or a PDA/MDA (personal digital assistant/multimedia digital assistant). For the use of standard products, existing interfaces and/or existing or proven technology, some embodiments of the present invention provides for the evaluation, identification, verification, cancellation and/or transmission to the selected telephone number to be carried out by using at least one switching exchange, via which the call is at least partially set up.

In some embodiments, for requesting the confirmation information, the telecommunications subscriber terminal device is first connected with a verification device accessible via at least one switching exchange in response to the identification of a service telephone number and a further connection to the selected service device is set up only in response to a match between the requested confirmation information and the confirmation information transmitted by the telecommunication subscriber terminal device.

Via this provision, it is further possible to perform a rate calculation of the offered verification service in a simple manner. In such embodiments, it may be provided for rate-calculation information to be transmitted to a rate-calculation and/or billing system for further processing in response to a verification as a function of the result or independently of the result of the verification.

Accordingly, in some embodiments of the system for implementing the method according to the present invention provide for a transmitting/receiving module of the verification device for transmitting information to and receiving information from the telecommunications terminal device, the transmitting/receiving module is configured in an application-specific manner for transmitting and receiving acoustic and/or visual information and/or having access to an interactive voice-communication system and/or a system for the use of a multi-frequency method.

In further embodiments, the evaluation device is to be capable of being activated in an application-specific manner in response to essentially any telephone number or merely in response to a specific initial number sequence.

For monitoring a predefined time interval within which the transmission of a requested confirmation signal by the telecommunication subscriber terminal device is to occur, the verification device may be connected in an expedient manner to a clock.

In further embodiments, the verification device in an expedient manner comprises a module for the unique assignment of the defined confirmation information to the desired call set-up and/or has an accordingly assigned module, for example, a random-number generator, for generating uniquely defined confirmation information.

In a further embodiment, the system further includes at least one device for return- and/or relay-connecting the telecommunications subscriber terminal device with the verification device in response to the identification of a service telephone number and for return- and/or relay-connecting the telecommunications subscriber terminal device with the selected service device in response to a match between the defined confirmation information and the confirmation information transmitted from the telecommunications subscriber terminal device.

For this purpose, the evaluation device, verification device and/or the return- and/or relay-connection device may be expediently assignable to at least one switching exchange, this switching exchange in the preferred further refinement being the switching exchange of a fixed network or a mobile telephony network via which the call is at least partially set up.

For the purpose of retrievably storing information assigned to a service telephone number, at least one database may be assigned to the verification device.

In further embodiments, the system according to the present invention may include a device, associated with the verification device, for generating rate-calculation information and for transmitting the rate-calculation information to a rate-calculation and/or billing system.

In further embodiments, the system according to the present invention may have interfaces for providing access from and/or to other communication networks, for example, the Internet.

In further embodiments, a computer-readable medium having a program code is provided, which when implemented in a computer, for example, within a system according to the present invention, effects the implementation of the method according to the present invention.

DETAILED DESCRIPTION

With subsequent reference to FIGS. 1 through 5, an embodiment(s) of the method according to the present invention is described, in which a telephone connection is established from a telecommunication subscriber via a telecommunications network 20 to a service device 40 for retrieving a service offer, for example, of a fee-based added-value service. This connection is established no longer by dialing the service telephone number of the respective service device directly, but rather in that the connection between the subscriber and service device 40 is cleared only after an explicit approval or confirmation on the part of the subscriber vis-à-vis a verification device 30 associated with telecommunications network 20 and implemented at the network operator, for example.

Figure 5:
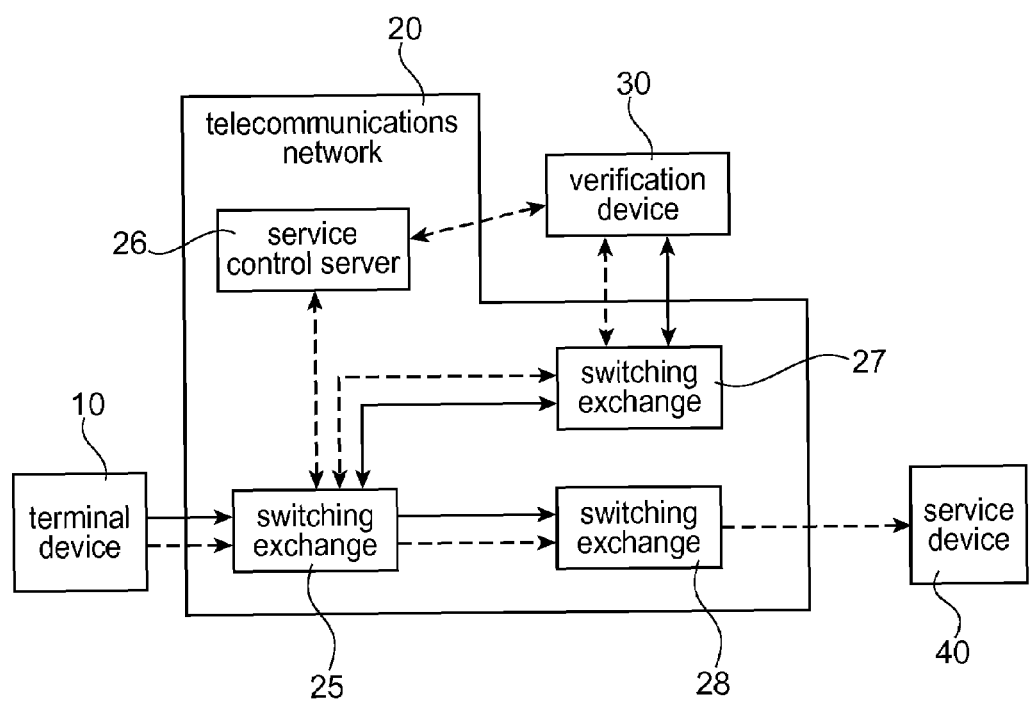
FIG. 5 shows an outline of an implementation of the method according to the present invention within a telecommunications network.

FIGS. 1 through 4 show an example sequence of a method of the present invention, while FIG. 5 shows a technical implementation in a communications network.

Within telecommunications network 20, the network operator may offer various connection services, for example, a normal connection service 22, a connection service at a uniquely fixed connection rate or so-called charging 23, and a connection service that provides the option of newly determining a connection rate or so-called recharging.

Further, a service 21 of analyzing or evaluating a telephone number may be offered.

From a telecommunications subscriber terminal device 10, which is a PC or a telephone for example, a subscriber dials into network 20, as indicated by arrow A. In the specific embodiment described, the subscriber dials for example the number sequence 012033(0)190012345. The telephone number analysis, preferably integrated into a switching exchange of the network operator, for example into switching exchange 25 as shown in FIG. 5, detects on the basis of the initial number sequence 012033 that the telephone number is to be evaluated with reference to a service telephone number.

The sequence of numbers following the initial number sequence, that is, in the present example the (0)190012345, indicates with sufficient completeness a service-specific number sequence of a provider of a service which is retrievable via a service device 40 associated with this service telephone number sequence. It is assumed in the present example that the service telephone number sequence (0)190012345 is the service-specific number sequence of the provider of a fee-based added-value service. Subsequently, the call A issuing from telecommunications subscriber terminal device 10 is relayed via the interposed connection service having a recharging functionality 24, as indicated by arrow B, first to a verification device 30 (arrow C).

In the present case, the relay has the effect of establishing a connection between telecommunications subscriber terminal device 10 and verification device 30, as indicated by arrow D. For this purpose, if indicated, the connection from the telecommunications subscriber terminal device 10 to the original switching exchange is first disconnected and a new connection is established accordingly. Such a disconnection and connection set-up occurs in the network of the network operator unnoticed by the subscriber. A rate calculation for this type of a return- and/or relay-connection call, that is, to verification device 30, suitably occurs as though subscriber terminal device 10 had originally established the connection.

Verification device 30 includes a database 32, a random-number generator 33 and a comparator 34 for implementing the actual verification of the selected telephone connection described below. Verification device 30 further may include an input/output module, with which telecommunications subscriber terminal device 10 is connected following the relay. The verification process is controlled via central control logic 31 of verification device 30.

The verification device, for example, a Web-based dialer protection server, then may search its database 32 for corresponding service-specific data of the selected fee-based added-value service and transfers this information to input/output module 35. Depending on the specific application, input/output module 35 for transmitting and receiving information is based on an interactive voice-communication system, uses a multifrequency method or, for example in a case of a Web-based verification server, is based on a multimedia information transmission system. As indicated by arrow F in FIG. 2, input/output module 35 transfers the service-specific data to telecommunications subscriber terminal device 10. These data may include, for example, information both about the content of the service as well as about the specific rate information on which the fee-based added-value service is based.

Figure 1:
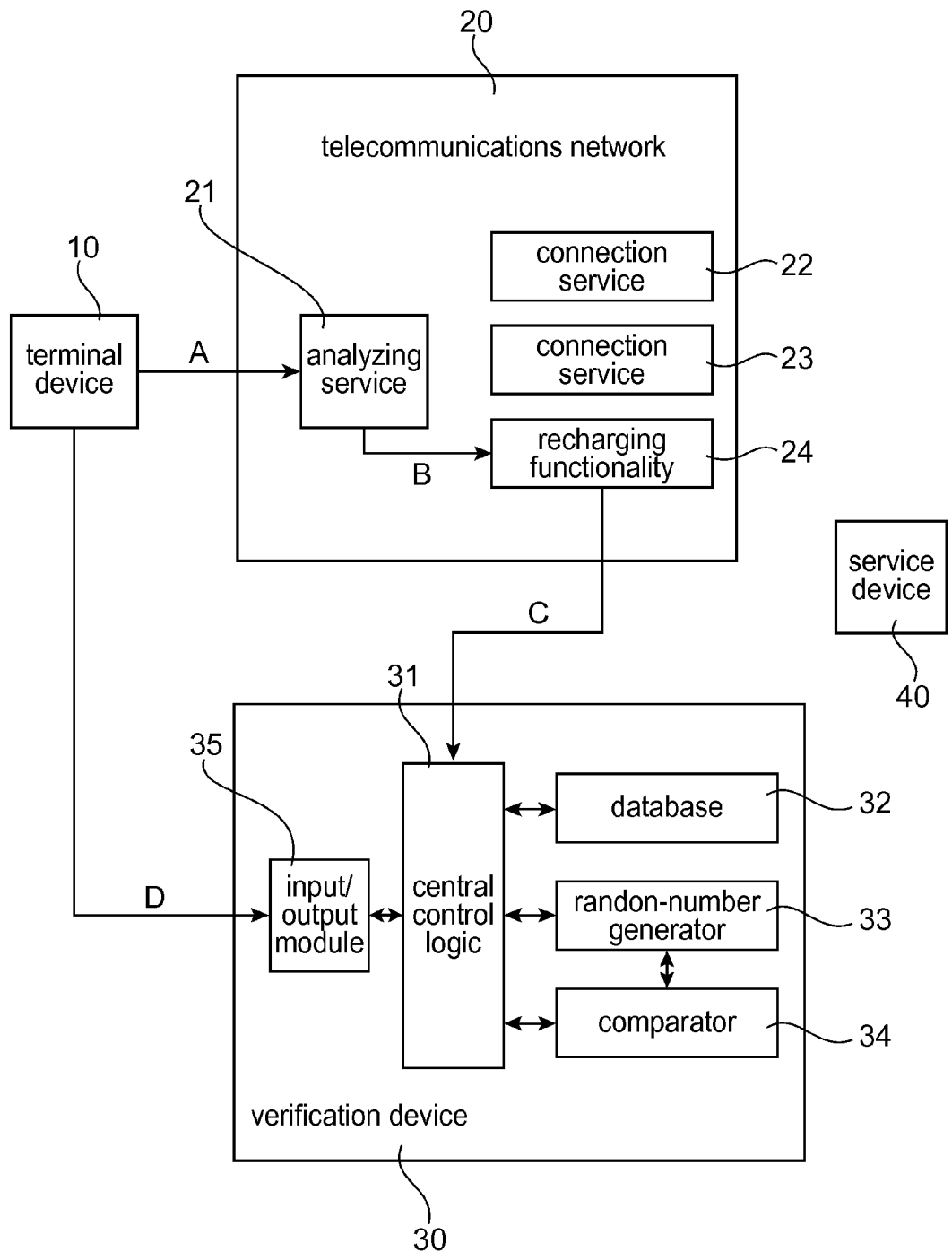
FIG. 1 shows a representation in principle of dialing into a verification device according to the method of the present invention.
Figure 2:
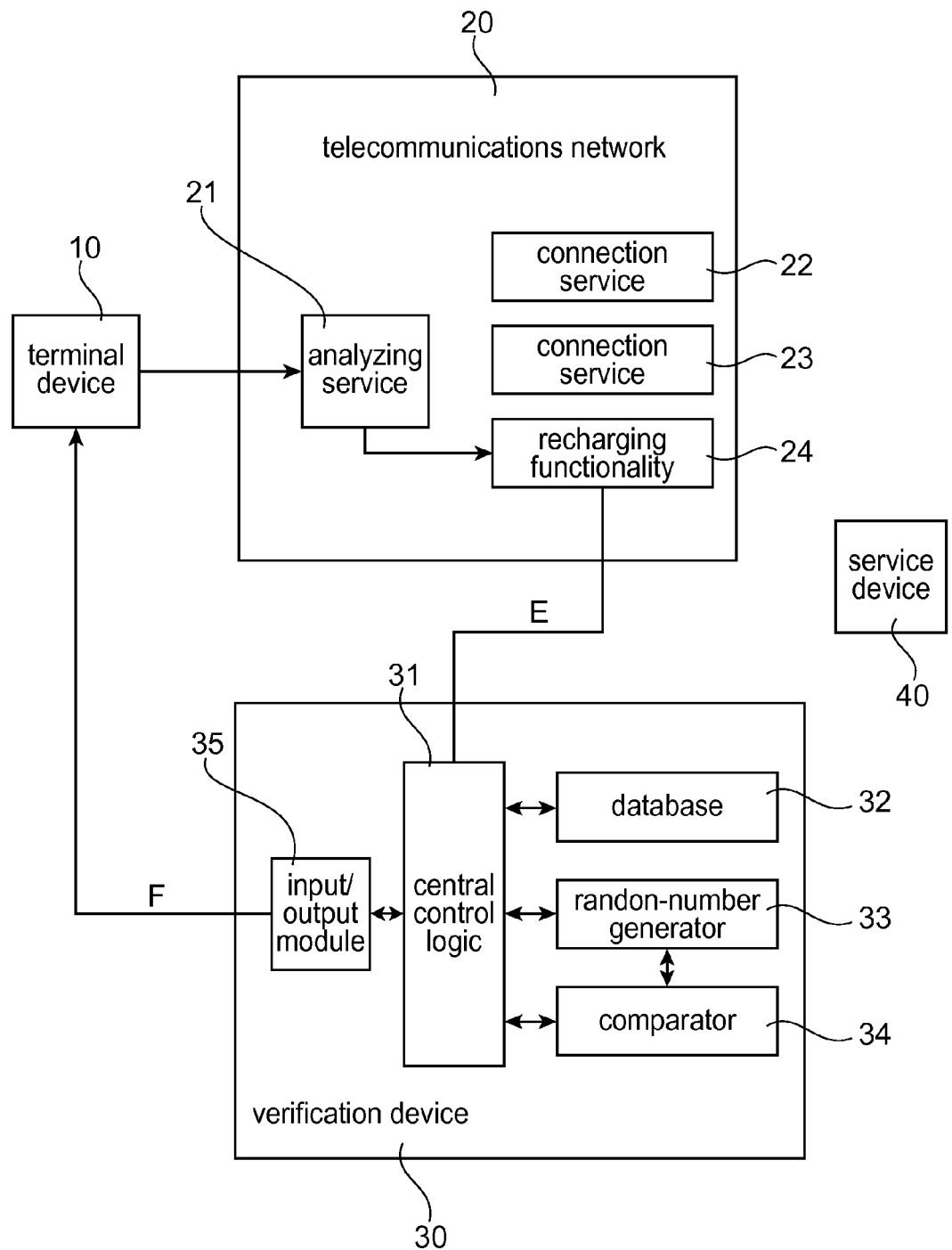
FIG. 2 shows a representation in principle of the transmission of information assigned to an identified service telephone number and of defined confirmation information to the dialing telecommunications terminal device.

Subsequently, a personal identification number (PIN) that can be used only once is generated by random-number generator 33 and is likewise transmitted for example by voice output via module 35 to subscriber terminal device 10 (arrow F). The generated number required for confirmation is further transferred to comparator 34. During these operations, as shown in FIG. 2 by the connecting line E, a connection between network 20 and verification device 30 may continue to exist, although this is not necessary.

Figure 3:
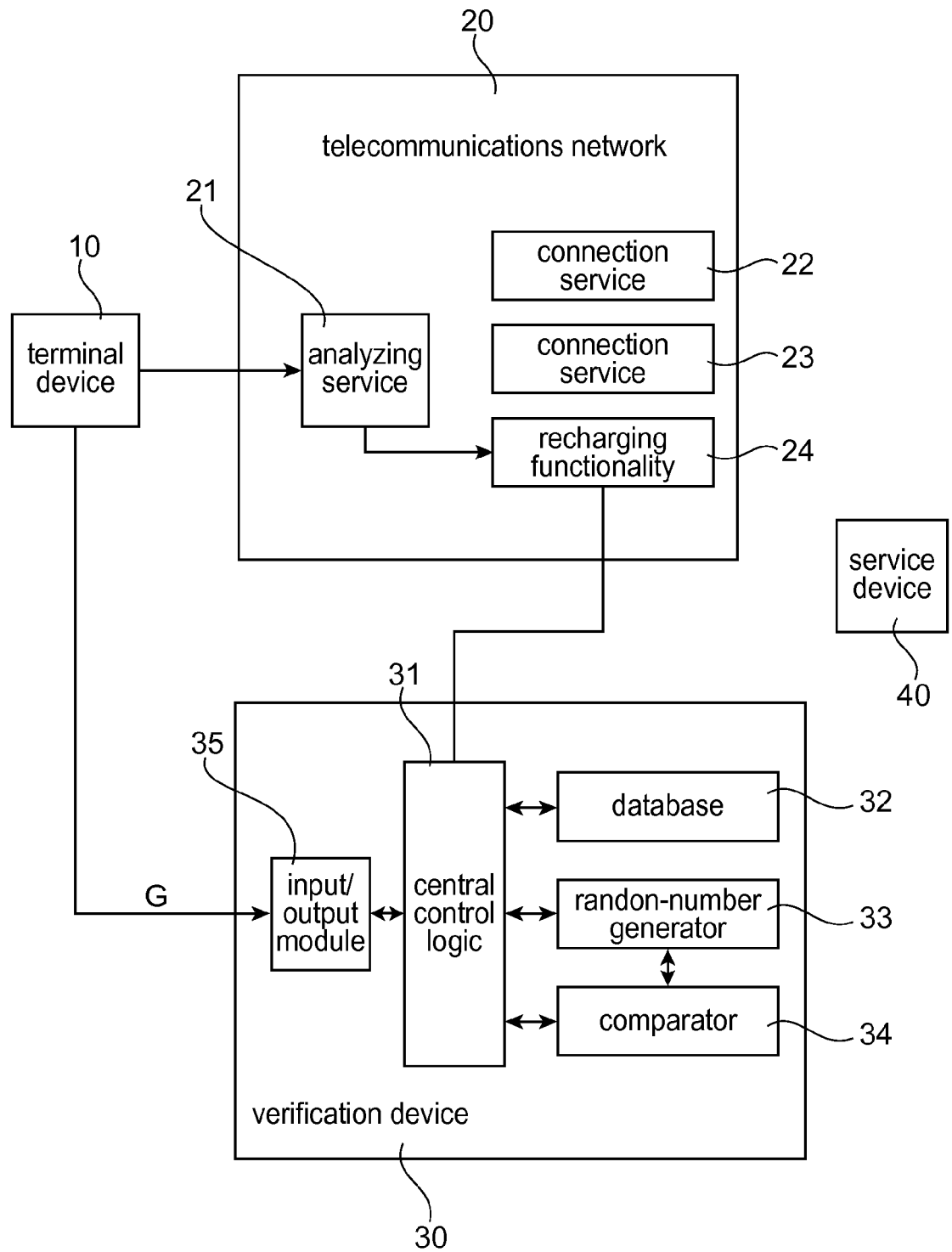
FIG. 3 shows a representation of the transmission of the requested confirmation information to the verification device.
Figure 4:
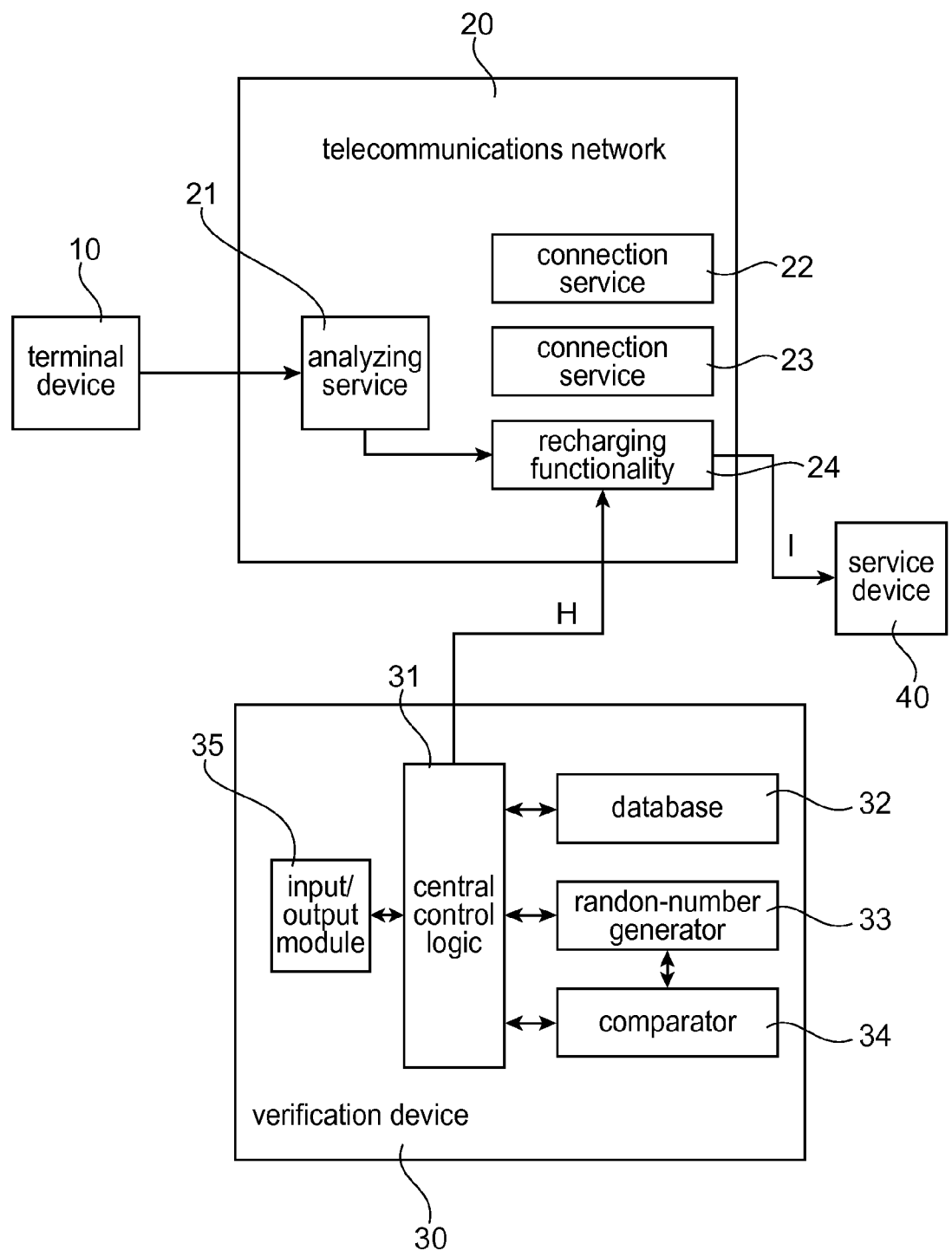
FIG. 4 shows a representation in principle of a set-up of a connection to the selected service device.

If the subscriber agrees to use the added-value service with the service it offers and the associated charges, the subscriber transmits his previously individually transmitted PIN as a confirmation, as indicated by arrow G in FIG. 3, from telecommunications subscriber terminal device 10 to verification device 30, for example, by voice input or via the telephone keypad by using a multifrequency method.

After comparator 34 has verified a match between the confirmation transferred from telecommunications subscriber terminal device 10 to verification device 30 and the previously generated confirmation number, the connection to the actual destination, that is, the respective service device 40 of the provider, is established for retrieving the respective fee-based added-value service.

For this purpose, standard mechanisms of existing telephone networks may be used, for example, those that effect a partial dismantling of a connection and a renewed establishment of a connection to the relay destination. To the subscriber of terminal device 10 it may seem as though the connection between himself and service device 40 was switched directly. And, if desired, a corresponding fee rate may also be applied in the switching exchange of the network operator.

FIG. 5 shows an example technical implementation of the above-described method according to the present invention, in which a network 20 of a network operator includes a plurality of switching exchanges 25, 27 and 28. Switching exchanges 25 and 27 relay a call from telecommunications terminal device 10 to verification device 30 by additionally using a service control server 26. Following a positive verification, the call is routed via switching exchanges 25 and 28 to selected service device 40. As can be seen from FIG. 5, in the event of a positive verification, a partial dismantling of the connection back to the original switching exchange 25 is thus effected and a connection is newly established via switching exchange 28 to the relay destination, that is, in the present case to selected service device 40 of the desired fee-based added-value service. A transmission of payload channel data implemented in the process is respectively shown by solid arrows, while a transmission of pure signaling data is indicated by dashed arrows.

In addition, the present invention includes embodiments in which the verification itself is subject to a rate calculation, which is supplied to a respectively associated rate-calculation and/or billing system following the completion of the verification. If the subscriber of terminal device 10 does not accept the conditions of the provider of the fee-based added-value service and consequently transmits no or another confirmation to the verification device (arrow G), then a relay will be prevented and the connection between subscriber terminal device 10 and network 20 will be released. Such a prevention of the relay-connection or the associated cancellation of the set-up of the call to the selected service device 40 may also occur if within a defined time interval no matching confirmation was transmitted from telecommunication device 10 to verification device 30.

If in the connection of telecommunications subscriber terminal device 10 additionally a permanent or variable telephone number blocking filter was switched for service telephone numbers of the telephone number space 019x, dialer programs would be unable to set up an automatic connection to a blocked telephone number.

The present invention involves further embodiments in which a specific initial number sequence is not necessary for activating a call analysis. In this case, it may be provided for the telephone number analysis to be configurable, for example, on the part of the subscriber, in such a way that it is able to be activated essentially in response to any arbitrary telephone number and that the verification procedure is carried out in response to the identification of a service telephone number in accordance with the above specification.

What is claimed is:

1. A method for a network-based verification of telephone connections from a telecommunications subscriber terminal device to a telecommunications service device selected via a service telephone number, comprising:
    during a call set-up, performing an evaluation of the dialed telephone number based on at least one service telephone number stored on the basis of at least one of a communications network and at least one service telephone number space;
    requesting a transmission of a defined confirmation information from the telecommunications subscriber terminal device for verifying the telephone connection in response to the identification of a service telephone number;
    performing an evaluation of the dialed telephone number only in response to a defined initial number sequence contained within the telephone number; and
    canceling the call set-up in response to a mismatch between the requested confirmation information and one or none of the confirmation information transmitted from the telecommunications subscriber terminal device.

2. The method as recited in claim 1, further comprising:
    transmitting a request for the transmission of the defined confirmation information to the telecommunications subscriber terminal device.

3. The method as recited in claim 2, wherein, following the request of the confirmation information, the call set-up is canceled in response to an elapse of a predefined time interval if no confirmation information is transmitted from the telecommunications subscriber terminal device.

4. The method as recited in claim 1, further comprising:
    assigning uniquely the defined confirmation information to the respective call set-up.

5. The method as recited in claim 1, further comprising:
    generating the defined confirmation information in response to the identification of a service telephone number with the aid of a random-number generator; and
    transmitting the defined confirmation information to the telecommunications subscriber terminal device.

6. The method as recited in claim 1, further comprising:
    in response to the identification of a service telephone number, transmitting stored information associated with the service telephone number to the telecommunications subscriber terminal device.

7. The method as recited in claim 1, wherein the transmission of information, including the confirmation information, to and/or from the telecommunications subscriber terminal device occurs by using an interactive voice-communication system, a multi-frequency method, visually and/or in terms of multimedia.

8. The method as recited in claim 1, wherein the transmission of information, including the confirmation information, to and/or from the telecommunications subscriber terminal device occurs by integrating at least one other communications network, in particular the Internet.

9. The method as recited in claim 1, wherein the evaluation, identification, verification, call cancellation and/or a return- and/or relay-connection of the call occurs by using at least one switching exchange, via which the call is at least partly set up.

10. The method as recited in claim 1, wherein in response to the identification of a service telephone number the telecommunications subscriber terminal device for requesting the confirmation information is return- and/or relay-connected with a verification device accessible via at least one switching exchange and a return- and/or relay-connection with the selected telecommunications service device is set up only in response to a match between the requested confirmation information and the confirmation information transmitted by the telecommunications subscriber terminal device.

11. The method as recited in claim 1, wherein rate-calculation information is transmitted to a rate-calculation and/or billing system in response to a verification to be performed or having been performed.

12. A system, assignable to at least one telecommunications network, comprising at least one memory for readably storing a number of service telephone numbers and/or service telephone number spaces, a device for evaluating a telephone number to which a call is to be set up from a telecommunications subscriber terminal device, based on a number of service telephone numbers and/or service telephone number spaces, at least one verification device, which is configured to compare a defined confirmation information with a confirmation information transmitted by the telecommunications subscriber terminal device in response to the identification of a service telephone number and is configured to cancel the call set-up in response to a mismatch between the defined confirmation information and the or none of the confirmation information transmitted by the telecommunications subscriber terminal device,
    wherein the device for evaluation is able to be activated only in response to a defined initial number sequence contained within the telephone number.

13. The system as recited in claim 12, wherein a transmitting/receiving module is associated with the verification device for transmitting information to and receiving information from the telecommunications terminal device.

14. The system as recited in claim 13, wherein the transmitting/receiving module is designed to transmit and receive acoustic, visual and/or multimedia information and/or has access to an interactive voice-communication system and/or to a system for using a multi-frequency method.

15. The system as recited in claim 12, wherein the verification device is connected to a clock in such a way that the call set-up is cancelled in response to the elapse of a predefined time interval if no confirmation information is transmitted from the telecommunication subscriber terminal device.

16. The system as recited in claim 12, wherein a module for the unique assignment of the defined confirmation information for the call set-up and/or a module for generating in each case uniquely defined confirmation information, in particular a random-number generator, is associated with the verification device.

17. The system as recited in claim 12, characterized by at least one device for return- and/or relay-connecting the telecommunications subscriber terminal device with the verification device in response to the identification of a service telephone number and for return- and/or relay-connecting the telecommunications subscriber terminal device with the selected telecommunications service device in response to a match between the defined confirmation information and the confirmation information transmitted from the telecommunications subscriber terminal device.

18. The system as recited in claim 17, wherein the evaluation device, the verification device and/or the return- and/or relay-connection device is associated with at least one of a switching exchange, a switching exchange of a fixed network, and a switching exchange of a mobile telephone network, via which the call is at least partly set up.

19. The system as recited in claim 17, wherein the telecommunications subscriber terminal device is a mobile telephony device or a fixed network device.

20. The system as recited in claim 17, wherein a database having retrievably stored information about service telephone numbers is associated with the verification device.

21. The system as recited in claim 17, characterized by a device for generating rate-calculation information and for transmitting the rate-calculation information to a rate-calculation and/or billing system associated with the verification device.

22. The system as recited in claim 21, characterized by interfaces for providing access from and/or to further communications networks, particularly the Internet.

23. A computer-readable medium including instructions adapted to execute a method for providing a network-based verification system of telephone connections, the method comprising;
- readably storing a number of service telephone numbers and/or service telephone number spaces in a memory;
- evaluating a telephone number to which a call is to be set up from a telecommunications subscriber terminal device, based on a number of service telephone numbers and/or service telephone number spaces;
- comparing a defined confirmation information with a confirmation information transmitted by the telecommunications subscriber terminal device in response to the identification of a service telephone number and configured to cancel the call set-up in response to a mismatch between the defined confirmation information and the or none of the confirmation information transmitted by the telecommunications subscriber terminal device, effecting a network-based verification of telephone connections from a telecommunications subscriber terminal device to a telecommunications service device selected via a service telephone number, including:
  - during a call set-up, performing an evaluation of the dialed telephone number based on at least one service telephone number stored on the basis of at least one of a communications network and at least one service telephone number space;
  - requesting a transmission of a defined confirmation information from the telecommunications subscriber terminal device for verifying the telephone connection in response to the identification of a service telephone number; and
  - canceling the call set-up in response to a mismatch between the requested confirmation information and one or none of the confirmation information transmitted from the telecommunications subscriber terminal device.

* * * * *